United States Patent
Todorovic et al.

(10) Patent No.: US 10,151,270 B2
(45) Date of Patent: Dec. 11, 2018

(54) ENGINE COWLING OF A GAS TURBINE WITH THRUST-REVERSING DEVICE AND CROSS-SECTIONALLY ADJUSTABLE OUTLET NOZZLE

(71) Applicant: Rolls-Royce Deutschland Ltd & Co KG, Blankenfelde-Mahlow (DE)

(72) Inventors: Predrag Todorovic, Berlin (DE); Carlos Omar Marquez Gutierrez, Berlin (DE); Gero Schieffer, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 369 days.

(21) Appl. No.: 15/047,257

(22) Filed: Feb. 18, 2016

(65) Prior Publication Data

US 2016/0245230 A1  Aug. 25, 2016

(30) Foreign Application Priority Data

Feb. 23, 2015 (DE) .................. 10 2015 203 219

(51) Int. Cl.
*F02K 1/72* (2006.01)
*F02K 1/09* (2006.01)
(Continued)

(52) U.S. Cl.
CPC ............... *F02K 1/72* (2013.01); *F02C 3/04* (2013.01); *F02C 7/14* (2013.01); *F02K 1/09* (2013.01);
(Continued)

(58) Field of Classification Search
CPC ..... F02K 1/06; F02K 1/09; F02K 1/54; F02K 1/64; F02K 1/70; F02K 1/72; F05D 2250/71
See application file for complete search history.

(56) References Cited

U.S. PATENT DOCUMENTS

| 3,262,268 | A | * | 7/1966 | Beavers | .................... F02K 1/72 239/265.19 |
| 3,500,645 | A | * | 3/1970 | Hom | ........................ F02K 1/72 239/265.29 |

(Continued)

FOREIGN PATENT DOCUMENTS

| DE | 2216220 A1 | * | 10/1972 | ............... F02K 1/72 |
| DE | 102011008917 A1 | * | 7/2012 | ............... F02K 1/72 |

(Continued)

OTHER PUBLICATIONS

German Search Report dated Nov. 16, 2015 from counterpart German App No. 10 2015 203 219.1.
(Continued)

*Primary Examiner* — Gerald L Sung
*Assistant Examiner* — Marc Amar
(74) *Attorney, Agent, or Firm* — Shuttleworth & Ingersoll, PLC; Timothy Klima

(57) ABSTRACT

An engine cowling of an aircraft gas-turbine engine with a thrust-reversing device, with a core engine and a bypass duct surrounding the latter, and with a front cowling enclosing the bypass duct and a rear cowling movable in the axial direction, as well as with cascade elements arranged over the circumference which can be placed by a substantially axial movement into an intermediate space resulting from a movement of the rear cowling relative to the front cowling, characterized in that the cascade elements are connected directly to the rear cowling, that the rear cowling has a rounded outer leading edge and that the cascade element has at its rear area a flow-guiding element, in front of which several thrust-reversing stator vanes are arranged and behind which at least one flow stator vane is arranged whose curvature shape matches the rounding of the outer leading edge of the rear cowling.

17 Claims, 3 Drawing Sheets

Figure 1:
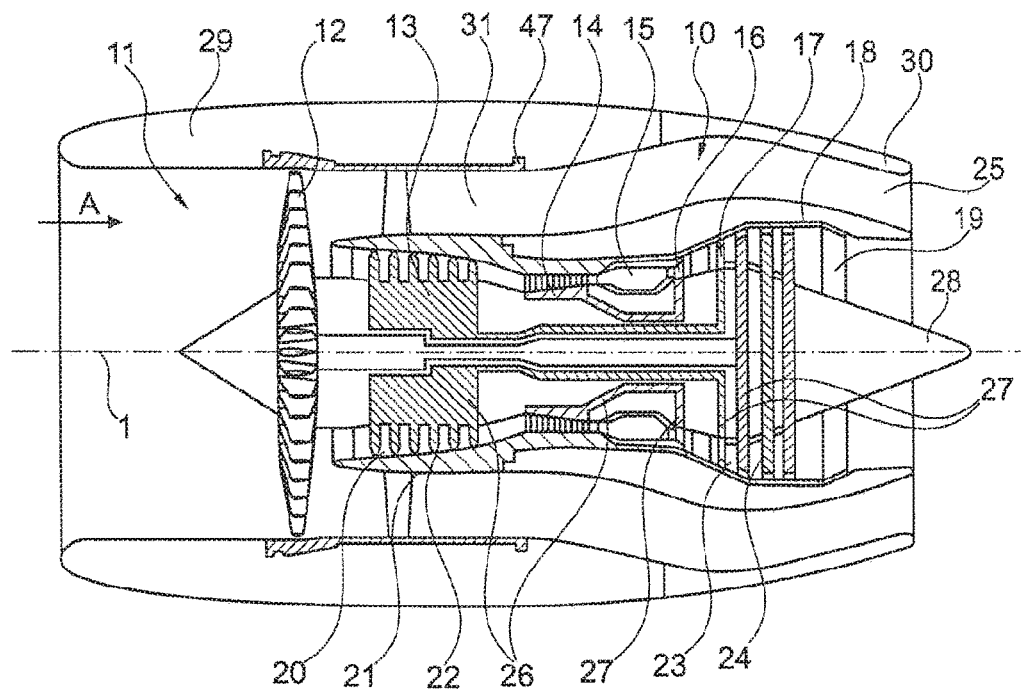

(51) Int. Cl.
*F02K 1/76* (2006.01)
*F02K 3/075* (2006.01)
*F02C 3/04* (2006.01)
*F02C 7/14* (2006.01)

(52) U.S. Cl.
CPC .............. *F02K 1/763* (2013.01); *F02K 1/766* (2013.01); *F02K 3/075* (2013.01); *F05D 2240/12* (2013.01); *F05D 2240/129* (2013.01); *F05D 2250/71* (2013.01); *F05D 2250/713* (2013.01); *F05D 2250/75* (2013.01); *Y02T 50/671* (2013.01)

(56) References Cited

U.S. PATENT DOCUMENTS

| | | | | |
|---|---|---|---|---|
| 3,500,646 A * | 3/1970 | Horn | ............ | F02K 1/72 239/265.29 |
| 3,511,055 A * | 5/1970 | Timms | ............ | F02K 1/72 239/265.29 |
| 3,703,258 A * | 11/1972 | Wildner | ............ | F02K 1/12 239/265.29 |
| 3,779,010 A * | 12/1973 | Chamay | ............ | F02K 1/09 239/265.31 |
| 3,820,719 A * | 6/1974 | Clark | ............ | F02K 1/09 239/265.31 |
| 4,716,724 A * | 1/1988 | Newton | ............ | F02K 1/72 239/265.29 |
| 4,731,991 A * | 3/1988 | Newton | ............ | F02K 1/72 239/265.31 |
| 6,546,715 B1 * | 4/2003 | Blevins | ............ | F02K 1/566 239/265.29 |
| 7,484,356 B1 * | 2/2009 | Lair | ............ | F02K 1/72 60/226.2 |
| 8,677,733 B2 | 3/2014 | Beardsley et al. | | |
| 8,938,944 B2 * | 1/2015 | Todorovic | ............ | F02C 7/14 184/6.11 |
| 9,376,986 B2 | 6/2016 | Todorovic | | |
| 2005/0229584 A1 * | 10/2005 | Tweedie | ............ | F02K 1/72 60/226.1 |
| 2008/0010969 A1 * | 1/2008 | Hauer | ............ | B64D 29/02 60/204 |
| 2008/0250770 A1 * | 10/2008 | Emprin | ............ | F02K 1/566 60/226.2 |
| 2010/0005777 A1 * | 1/2010 | Marshall | ............ | F02K 1/09 60/204 |
| 2010/0064659 A1 * | 3/2010 | Wang | ............ | F02K 1/09 60/226.2 |
| 2010/0270428 A1 * | 10/2010 | Murphy | ............ | F02K 1/72 244/110 B |
| 2012/0285138 A1 * | 11/2012 | Todorovic | ............ | F02C 7/14 60/230 |
| 2013/0025259 A1 * | 1/2013 | Beardsley | ............ | F02K 1/72 60/226.2 |
| 2014/0027537 A1 | 1/2014 | Binks et al. | | |
| 2014/0116026 A1 | 5/2014 | Todorovic | | |
| 2014/0325957 A1 * | 11/2014 | Aten | ............ | F02K 1/766 60/226.2 |
| 2015/0108249 A1 * | 4/2015 | James | ............ | F02K 1/62 239/265.19 |
| 2015/0308379 A1 * | 10/2015 | James | ............ | F02K 1/72 60/226.2 |
| 2016/0298574 A1 * | 10/2016 | Sawyers-Abbott | .... | B64D 27/10 |
| 2016/0326984 A1 * | 11/2016 | Marcos | ............ | F01D 21/14 |

FOREIGN PATENT DOCUMENTS

| | | | |
|---|---|---|---|
| DE | 102011101342 A1 | 11/2012 | |
| EP | 2522831 A2 | 11/2012 | |
| EP | 2628936 A2 | 8/2013 | |
| FR | 1260040 A * | 5/1961 | ............ F02K 1/32 |
| FR | 2088393 A1 * | 1/1972 | ............ F02K 1/563 |
| GB | 925010 A * | 5/1963 | ............ F02K 1/32 |
| GB | 1386232 A | 3/1975 | |

OTHER PUBLICATIONS

European Search Report dated Jul. 21, 2016 for counterpart European Application No. 16156314.3.

* cited by examiner

ENGINE COWLING OF A GAS TURBINE WITH THRUST-REVERSING DEVICE AND CROSS-SECTIONALLY ADJUSTABLE OUTLET NOZZLE

This application claims priority to German Patent Application 102015203219.1 filed Feb. 23, 2015, the entirety of which is incorporated by reference herein.

This invention relates to a thrust-reversing device of an aircraft gas-turbine engine in accordance with features disclosed herein.

In detail, the invention relates to a thrust-reversing device of an aircraft gas-turbine engine with a core engine and a bypass duct surrounding the latter, and with a front cowling enclosing the bypass duct and a rear cowling movable in the axial direction, as well as with cascade elements arranged over the circumference which can be placed by a substantially axial movement into an intermediate space resulting from a movement of the rear cowling relative to the front cowling.

As state of the art, reference is made to U.S. Pat. No. 8,677,733 B2, which shows an engine cowling with a thrust-reversing device, in which a rear cowling can be moved in the axial direction by means of a separate drive. The movement is in two stages: in a first stage, the rear cowling is moved only over part of the maximum possible movement length, in order to open an annular gap through which air can be discharged out of the bypass duct to the environment, in order to change the cross-sectional surface of the outlet nozzle of the bypass duct. In a second position, there is a complete movement of the rear cowling in order to place, by means of a second and separate drive, the cascade elements into the thrust-reversing opening formed. At the same time, the bypass duct is closed by means of door-like blocking elements, so that the entire flow can be diverted for thrust reversal against the direction of flight.

The partial movement of the rear cowling into the first position is performed for example to avoid vibrations or flow separations at the fan, and to prevent flutter of the fan.

The cascade elements have on the one hand thrust-reversing stator vanes which divert the flow for thrust reversal. On the other hand, flow stator vanes are provided on part of the overall length of the cascade elements and are intended to divert the flow during adjustment of the cross-sectional surface of the outlet nozzle such that the flow adheres to the surface of the rear cowling.

In this previously known design, it has proved disadvantageous that the rear cowling and the cascade elements must each have their own drives, with the drive of the cascade elements moving these into different positions.

Designs are also known from the state of the art in which fixed cascade elements are used, the function of which depends on the respective position of the rear cowling.

The previously known designs are all characterized by a relatively high weight. They require a heavy expenditure and a complex control system for the drive of the individual elements. A further disadvantage is the high noise generation. Fixed cascades result in a greater structural length of the engine cowling (nacelle), since said fixed cascades are always fully accommodated inside the engine cowling (transcowl) in the cruise configuration (stowed position). Due to the suitably designed annulus shape in the thrust-reversing configuration (deployed position), the direction of the air is diverted over a sharp edge, so that a fan casing (fan ramp) is in an "air shadow" and does not have a positive effect on the airflow diversion. This reduces the efficiency of the thrust reversers. Engine cowlings of this type have a high weight and are characterized by poorer effectiveness.

The object underlying the present invention is to provide an engine cowling of the type mentioned at the beginning, which while being simply designed and easily and cost-effectively producible avoids the disadvantages of the state of the art and leads to improved functionality and operational safety, while having a lower weight and a short structural length.

It is a particular object to provide a solution to the above problems by a combination of features disclosed herein. Further advantageous embodiments will become apparent from the present disclosure.

In accordance with the invention, an engine cowling of an aircraft gas-turbine engine having a thrust-reversing device is thus provided, with a core engine and a bypass duct surrounding the latter, and with a front cowling enclosing the bypass duct and a rear cowling movable in the axial direction, as well as with cascade elements arranged over the circumference which can be placed by a substantially axial movement into an intermediate space resulting from a movement of the rear cowling relative to the front cowling, characterized in that the cascade elements are connected directly to the rear cowling, that the rear cowling has a rounded outer leading edge and that the cascade element has at its rear area a flow-guiding element, in front of which several thrust-reversing stator vanes are arranged and behind which at least one flow stator vane is arranged whose curvature shape matches the rounding of the outer leading edge of the rear cowling.

The invention is characterized by a variety of considerable advantages. Firstly, in accordance with the invention the rear cowling is coupled to the cascade elements, so that no additional drive is required for the cascade elements. Instead, the movement of the rear cowling leads at the same time to a movement of the cascade elements in the axial direction.

In the description of the invention the terms "front" and "rear" each relate to the flow direction at the engine cowling or through the bypass duct. The terms "inside" and "outside" each relate to a radial direction starting at the engine axis or its axial direction.

In accordance with the invention, the cascade elements thus have a split of their functionality in the longitudinal direction. The front area of the cascade elements is provided with thrust-reversing stator vanes, which after a complete movement of the rear cowling are arranged in the thrust-reversing opening formed by said movement and which divert the flow of the bypass duct against the main flow direction for thrust reversal. This area of the cascades provided with the thrust-reversing stator vanes is split by the flow-guiding element located in a rear area of the cascade element. Behind the flow-guiding element, at least one flow stator vane is provided which has an opposite curvature relative to the thrust-reversing stator vanes. This curvature is designed such that a partial flow from the bypass duct exiting through an outflow gap is diverted and passed along the surface of the rear cowling in a flow-optimized manner. The required functionality of the cascade elements can thus be achieved depending on the movement of the rear cowling.

In accordance with the invention, it is particularly favourable when a substantially annular and rounded recess is provided in the rear cowling and radially on the inside on the rounded outer leading edge of the rear cowling (blocker doors). This recess leads, in an advantageous development, to a cross-sectional contour of the front area of the rear cowling which is S-shaped or swan-necked. This contour is assured on the one hand by the rounding of the outer leading edge of the rear cowling and on the other hand by the design of the annular and rounded recess. The flow stator vane of the cascade element, which matches in its curvature the rounding of the outer leading edge of the rear cowling, thus acts like a slat in a wing of an aircraft and directs the flow exiting through the outflow gap onto the surface of the rear cowling in a flow-optimized manner.

In a particularly favourable development of the invention, it is provided that the flow-guiding element has a substantially triangular cross-section and is designed at its front side to match the curvature in the contour of the thrust-reversing stator vanes and at its rear side to match the curvature of the flow stator vane. This results in optimized routing of the flow, with the flow-guiding element splitting the two functional areas of the cascade element without impairing the functionality of the latter.

To achieve thrust reversal, it is particularly advantageous when at least one swivellable door-like blocking element (blocker door) is arranged at the front area of the rear cowling on the inside of the latter. In normal flight, the blocking element is swiveled into the rear cowling, so that the flow through the bypass duct is not hindered. In the partially moved state of the rear cowling too, for adjusting the cross-section of the outlet nozzle, the blocking element is arranged in the rear cowling. When the blocking element is swivelled in the thrust-reversing position of the rear cowling, said blocking element at least partly closes the outflow gap, so that the flow past the rounded outer leading edge of the rear cowling is reduced.

In accordance with the invention, the rear cowling is thus moved together with the cascade elements into different positions by means of a single drive unit. The result of this is on the one hand a considerable simplification of the overall design, entailing a considerable weight reduction, and on the other hand the provision of an operationally reliable design, since only a single drive unit is required that has to be controlled and monitored. In accordance with the invention, therefore, many components of the previously known thrust-reversing device can be used.

Figure 2:
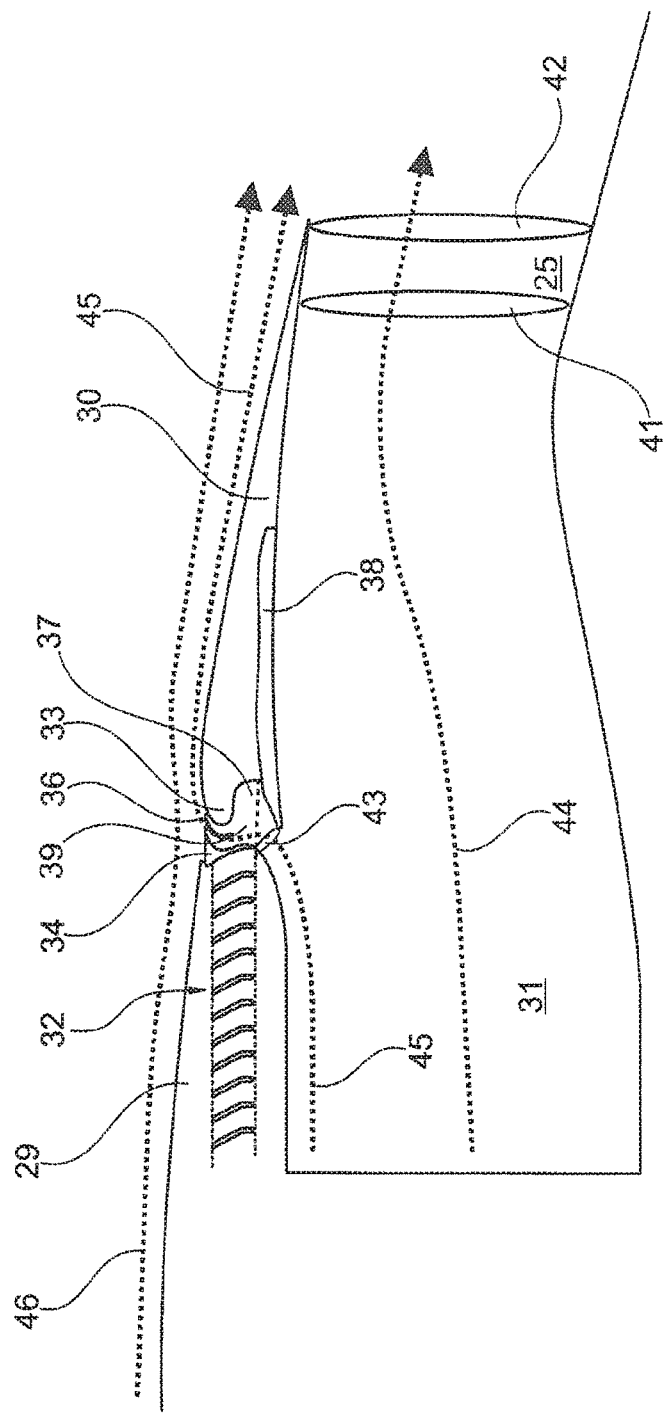
Figure 3:
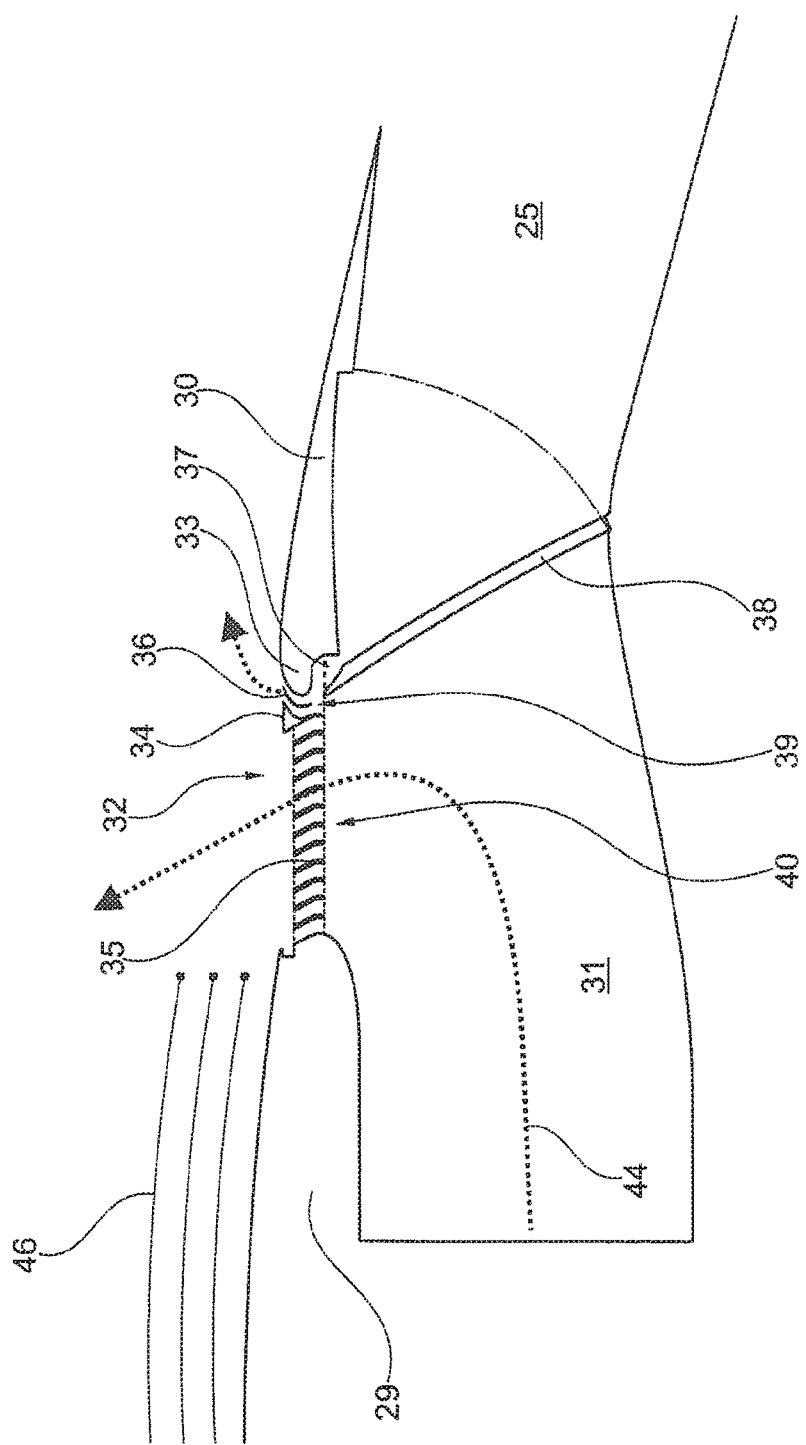

The present invention is described in the following on the basis of an exemplary embodiment. Here, FIG. 1 shows a schematic representation of a gas-turbine engine in accordance with the present invention, FIG. 2 shows a simplified sectional side view of the thrust-reversing device in accordance with the present invention, in partially opened state, and FIG. 3 shows a view, by analogy with FIG. 2, in the thrust-reversing position.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation. The reference numeral 28 shows an exhaust cone.

FIG. 1 furthermore shows a split of the engine cowling (nacelle) into a front cowling 29 and a rear cowling 30 movable in the axial direction relative to the engine axis or to the flow direction. A bypass duct 31 is formed between the core engine casing 21 and the outer cowlings 29 and 30 and has an outlet nozzle 25 which can be adjusted in its cross-section by an axial movement of the rear cowling 30 in order to influence the flow conditions at the fan 12 and in particular prevent flutter of the fan.

FIGS. 2 and 3 show simplified representations of an exemplary embodiment of the invention. Here, a rear area of the front cowling 29 is shown in which cascade elements are arranged in a flight position. The front area of the rear cowling 30 is, in this closed flight position, substantially in sealing contact with the rear area of the front cowling 29. This completely closed flight position is not shown in FIGS. 2 and 3; instead FIG. 2 shows a partially opened state while FIG. 3 illustrates the thrust-reversing state.

As can be seen from FIG. 2, the rear cowling 30 has a rounded outer leading edge 33. An annular recess 37 provided with rounded walls is designed radially on the inside relative to the rounded outer leading edge 33. This results in a swan-necked or S-shaped contour. A door-like blocking element 38 is arranged at the inner area of the rear cowling 30 and is, in the closed flight position and also in the partially opened position shown in FIG. 2, integrated into the rear cowling 30 and hence does not impede a flow through the bypass duct 31.

The cascade elements 32 in accordance with the invention have at their rear end area a flow stator vane 36 whose curvature matches the rounded outer leading edge 33 of the rear cowling 30 for an optimum flow. The flow stator vane 36 thus forms, with regard to its functionality, a slat that is known from landing flap systems of wings. In front of the flow stator vane 36, a flow-guiding element 34 designed with triangular cross-section is arranged and, as can be seen from FIG. 3, is part of the cascade element 32. The flow-guiding element 33 is provided on its rear side with a curvature matching the curvature of the flow stator vane 36. The remainder of the cascade element 32 is arranged in the front cowling 29 in the partially opened state shown in FIG. 2.

FIG. 2 shows the outlet nozzle 25. A first cross-section 41 is drawn schematically here, and results when the rear cowling 30 is in the completely closed position (flight state). The cross-section 42, which is larger than the cross-section 41, is obtained in the partially opened state shown in FIG. 2. The additional cross-section 43 widens the opening.

FIG. 2 shows with the dotted line a flow 44 through the bypass duct 31. Part of this flow is, as indicated by the reference numeral 45, routed out of the bypass duct 31 through the outflow gap 39 formed during a partial movement of the rear cowling 30, resulting in a third flow cross-section 43. The flow passes through the recess 37 (not shown in detail in FIG. 2) and follows the contour of the rounded outer leading edge 33, the curvature of the flow stator vane 36 and the contour of the rearward surface of the flow-guiding element 34, and adhers in a flow-optimized manner to the outer surface of the rear cowling 30. The reference numeral 46 shows the outside flow at the engine cowling.

A further movement of the rear cowling 30 results in the operating state shown in FIG. 3. In this case, the door-like blocking element 38 is swiveled to close the outlet nozzle 25. The cascade element 32 is moved completely out of the front cowling 29 by the movement of the rear cowling 30, so that thrust-reversing stator vanes 35 of the cascade element 32 can be passed through by the flow 44 of the bypass duct 31. This results in a thrust reversal.

As can be seen from FIG. 3, the swiveled blocking element 38 blocks at least part of the outflow gap 39, so that only a reduced residual flow can pass along the flow stator vane 36. Due to the swan-necked design of the air gap, the function of the fan casing (fan ramp) is retained in the thrust-reversing mode. This has the effect of increasing efficiency.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Outlet nozzle
26 Compressor drum or disk
27 Turbine rotor hub
28 Exhaust cone
29 Front cowling
30 Rear cowling
31 Bypass duct
32 Cascade element
33 Rounded outer leading edge
34 Flow-guiding element
35 Thrust-reversing stator vane
36 Row stator vane
37 Recess
38 Blocking element
39 Outflow gap
40 Thrust-reversing opening
41 First cross-section
42 Second cross-section
43 Third cross-section
44 Flow through the bypass duct
45 Flow
46 Outside flow
47 Fan casing

What is claimed is:

1. An engine cowling of an aircraft gas-turbine engine, where the aircraft gas-turbine engine includes a thrust-reversing device, a core engine and a bypass duct surrounding the core engine, comprising:
    a front cowling enclosing the bypass duct,
    a rear cowling movable in an axial direction of the aircraft gas-turbine engine,
    a plurality of cascade elements arranged around a circumference of the engine cowling, the plurality of cascade elements being connected directly to the rear cowling to be driven by the rear cowling such that a movement of the rear cowling in the axial direction relative to the front cowling moves the plurality of cascade elements in the axial direction into an intermediate space between the front cowling and the rear cowling,
    wherein the rear cowling includes a rounded outer leading edge,
    wherein at least one of the plurality of cascade elements includes:
        a flow-guiding element at a rear area of the at least one of the plurality of cascade elements,
        a plurality of thrust-reversing stator vanes positioned in front of the flow-guiding element and configured to direct airflow,
        a flow stator vane arranged behind the flow-guiding element, the flow stator vane having a curvature shape that matches the rounded outer leading edge of the rear cowling, the flow stator vane being configured to direct airflow in a different direction than the plurality of thrust-reversing stator vanes.

2. The engine cowling in accordance with claim 1, and further comprising wherein a substantially annular and rounded recess positioned in the rear cowling and radially on an inside of the rounded outer leading edge of the rear cowling.

3. The engine cowling in accordance with claim 2, wherein a cross-sectional contour of the rounded outer leading edge and of the recess is substantially S-shaped.

4. The engine cowling in accordance with claim 3, wherein the flow-guiding element has a substantially triangular cross-section and is shaped at a front side to match a curvature in a contour of the plurality of thrust-reversing stator vanes and at a rear side to match the curvature shape of the flow stator vane.

5. The engine cowling in accordance with claim 4, and further comprising a swivellable blocking element arranged at a front area of the rear cowling on an interior of the rear cowling.

6. The engine cowling in accordance with claim 5, wherein the rear cowling is movable into a first position to open an outflow gap between the rear side of the flow-guiding element and the rounded outer leading edge, and into a second position to completely open a thrust-reversing opening.

7. The engine cowling in accordance with claim 4, wherein the rear cowling is movable into a first position to open an outflow gap between the rear side of the flow-guiding element and the rounded outer leading edge, and into a second position to completely open a thrust-reversing opening.

8. The engine cowling in accordance with claim 1, wherein a cross-sectional contour of the rounded outer leading edge and of a recess positioned in the rear cowling is substantially S-shaped.

9. The engine cowling in accordance with claim 8, wherein the flow-guiding element has a substantially triangular cross-section and is shaped at a front side to match a curvature in a contour of the plurality of thrust-reversing stator vanes and at a rear side to match the curvature shape of the flow stator vane.

10. The engine cowling in accordance with claim 9, and further comprising a swivellable blocking element arranged at a front area of the rear cowling on an interior of the rear cowling.

11. The engine cowling in accordance with claim 10, wherein the rear cowling is movable into a first position to open an outflow gap between the rear side of the flow-guiding element and the rounded outer leading edge, and into a second position to completely open a thrust-reversing opening.

12. The engine cowling in accordance with claim 1, wherein the flow-guiding element has a substantially triangular cross-section and is shaped at a front side to match a curvature in a contour of the plurality of thrust-reversing stator vanes and at a rear side to match the curvature shape of the flow stator vane.

13. The engine cowling in accordance with claim 12, and further comprising a swivellable blocking element arranged at a front area of the rear cowling on an interior of the rear cowling.

14. The engine cowling in accordance with claim 13, wherein the rear cowling is movable into a first position to open an outflow gap between the rear side of the flow-guiding element and the rounded outer leading edge, and into a second position to completely open a thrust-reversing opening.

15. The engine cowling in accordance with claim 1, and further comprising a swivellable blocking element arranged at a front area of the rear cowling on an interior of the rear cowling.

16. The engine cowling in accordance with claim 15, wherein the rear cowling is movable into a first position to open an outflow gap between the rear side of the flow-guiding element and the rounded outer leading edge, and into a second position to completely open a thrust-reversing opening.

17. The engine cowling in accordance with claim 1, wherein the rear cowling is movable into a first position to open an outflow gap between the rear side of the flow-guiding element and the rounded outer leading edge, and into a second position to completely open a thrust-reversing opening.

* * * * *